Aug. 19, 1958     J. C. HARTLEY ET AL     2,847,786
COMPOSITE FIREARM BARREL COMPRISING GLASS FIBERS
Filed Feb. 7, 1955     4 Sheets-Sheet 1

*INVENTORS.*
JAMES C. HARTLEY
HARRY I. DAY
BY   JOHN L. WILSON

Pennie, Edmonds, Morton, Barrows & Taylor
ATTORNEYS

Aug. 19, 1958  J. C. HARTLEY ET AL  2,847,786
COMPOSITE FIREARM BARREL COMPRISING GLASS FIBERS
Filed Feb. 7, 1955  4 Sheets-Sheet 3

INVENTORS.
JAMES C. HARTLEY
HARRY I. DAY
BY  JOHN L. WILSON

ATTORNEYS

Aug. 19, 1958  J. C. HARTLEY ET AL  2,847,786
COMPOSITE FIREARM BARREL COMPRISING GLASS FIBERS
Filed Feb. 7, 1955  4 Sheets-Sheet 4
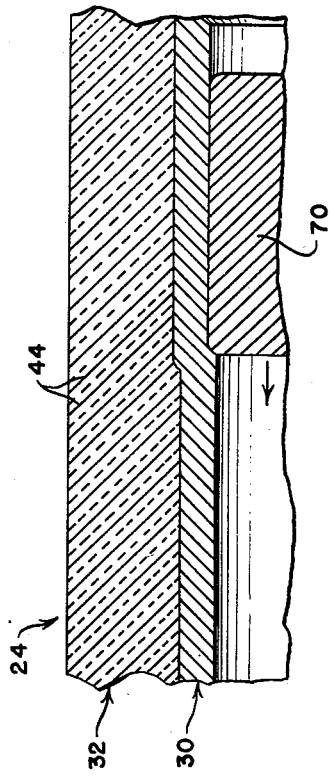
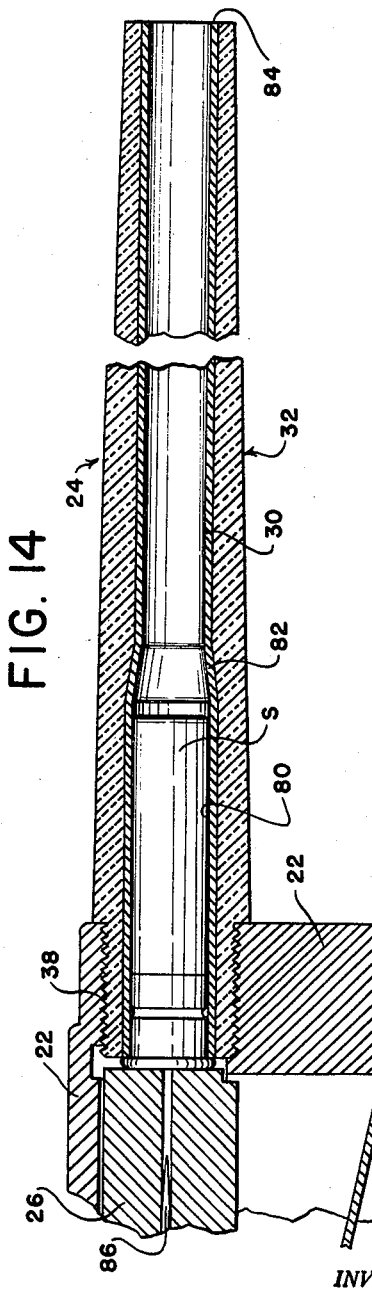
INVENTORS.
JAMES C. HARTLEY
HARRY I. DAY
BY JOHN L. WILSON
Pennie, Edmonds, Morton, Barrows & Taylor
ATTORNEYS 2,847,786
Patented Aug. 19, 1958

2,847,786
COMPOSITE FIREARM BARREL COMPRISING GLASS FIBERS

James C. Hartley, Branford, Conn., Harry I. Day, Wellesley, Mass., and John L. Wilson, Madison, Conn., assignors to Olin Mathieson Chemical Corporation, New Haven, Conn., a corporation of Virginia Application February 7, 1955, Serial No. 486,322

3 Claims. (Cl. 42—76)

This invention relates to a novel structural element which is outstandingly useful for the containment of very high stresses of very short duration, such as are encountered in firearm barrels and other instantaneous pressure devices. The invention will be described with particular reference to firearm barrels, which are characterized by the provision of a projectile discharge bore wherein a suitable charge of propellant, such as smokeless powder, exerts its high pressure for a short time on the projectile to impart thereto the desired ballistic characteristics.

Alloy and carbon steels have been extensively used in gun barrels which are capable of withstanding the stresses resulting from the firing of cartridges and shot shells under normal conditions, and are also capable of withstanding, to a great extent, abnormal stresses which are encountered when a shot shell or cartridge is fired against an obstruction in the barrel. Properly made, such gun barrels exhibit the important and desirable characteristics of non-fragmentation if the barrel should burst because of excessive loading.

One of the ends constantly sought in gun designing and manufacture is lightness. But unless the barrel is made of a different material from those heretofore used, the weight of the barrel cannot be reduced without sacrificing strength and thus reducing the ability of the barrel to withstand abnormal stresses to which it might be subjected if the barrel is obstructed when the gun is fired. The ratio of strength to weight is a matter of compromise not permitting much variance in what is looked upon as standard practice with the materials heretofore available for manufacture of gun barrels.

Aluminum has been tried in shot-gun barrels with apparent initial success. That is, a shot-gun with an aluminum barrel produced excellent endurance and wear characteristics under normal conditions. But a satisfactory gun, either sporting or military, must be designed to meet abnormal conditions, such as firing of a shell when the barrel is clogged. Because of this, gun manufacturers submit new gun barrel designs to certain tests in which shells are fired through barrels against certain predetermined obstructions. When aluminum barrels were tested in this manner, it was found that instead of bulging or bursting, as present-day steel barrels do, the aluminum was shattered and fragments were blown in all directions, thus producing a very dangerous condition.

In the present invention, we provide a light-weight barrel for firearms of all kinds which will withstand, without significant change, firing conditions under which present-day steel alloy barrels would bulge or burst. However, if the gun should be fired under even more extreme conditions causing the liner to burst, the metal particles will be contained and not be scattered. The barrel of the present invention is of a composite type, the components of which cooperate to lend to the barrel the attributes of greatly increased strength under high intensity stresses of very short duration so as to render it substantially burst-and-fragmentation proof on the one hand, and an overall weight usually substatially less than that of present-day barrels on the other hand.

An object of the present invention is to provide a firearm barrel of the composite type the components of which may be arranged to lend to the barrel vastly increased strength under high intensity stresses of very short duration not only radially but longitudinally as well, thereby not only rendering the barrel burst-and-fragmentation proof as aforementioned, but also permitting therein the safe use of higher energy propellants, with the ensuing advantage of permitting the firing from the barrel of projectiles at greater velocity in a flatter trajectory than was possible heretofore, with a substantial decreased barrel weight.

The use of a composite barrel of materials having widely different resonance characteristics also produces a more effective and satisfactory damping of the vibrations produced on firing the projectile. The accuracy of present-day rifles is known to be adversely affected by the vibrations which are induced through the oscillatory nature of the propellant burning and also by the stresses transmitted to the barrel material through the movement of the projectile down the bore. These vibrations, while of very small amplitude, produce a significant transverse force component in the projectile at the instant of its departure from the bore. Differences in vibration load with respect to the projectile exit produce varying transverse forces which are responsible for a considerable proportion of the shift of the flight path in successive shots. However, where the barrel is formed of materials having widely different resonance periods, the early damping of these vibrations tends to significantly minimize transverse forces on the projectile and thus to decrease variations in the flight path from shot to shot.

To attain these ends we provide a firearm barrel type which has as one of its components an inner liner of any suitable material, such as aluminum, steel, stainless steel or titanium, for instance, which is primarily relied on to provide in the barrel a suitable projectile discharge bore, that may be rifled, and which will withstand the erosive action of projectiles and hot powder gases, and has sufficient hardness to withstand engraving pressures of the projectile, and which has as its other component an outer jacket bonded to the liner and formed of a multiude of light-weight fibers of relatively high individual strength, which is primarily relied on to lend the barrel the overall strength required to render the same burstproof as aforementioned. The liner distributes the stresses to the jacket fibers most uniformly causing them to act in unison rather than individually.

A further object of the present invention is to provide a firearm barrel of the composite type of which the aforementioned jacket is conveniently and advantageously formed directly on the liner by winding the fibers of the former on the latter either in separte strands or in the form of woven tape or cloth.

It is another object of the present invention to provide a firearm barrel of the composite type of which the separate strands of the jacket may be wound on the liner at different helix angles in superposed layers or in parts of these layers, thereby to achieve selective radial and/or longitudinal strength, or both, of the barrel for any contemplated purpose.

The wound fibers are preferably secured to each other and to the liner by a suitable binder, such as a resin, for instance, which integrates these fibers and the liner into a composite barrel unit and provides a construction in which the fibers cooperate with the liner in taking up stresses. The jacket may either be formed by wrapping the liner with a mat formed of bonded short fibers with or without long fibers, or by applying to the liner a slurry of fibers in a binder and, in order to lend to the barrel certain desired properties with respect to vibration-damping, rigidity or stiffness, corrosion resistance, surface friction or wear resistance, heat dissipation, or coloring, for instance, suitable fillers may be added to the binder.

It is still another object of the present invention to provide a composite firearm barrel in which the fibers in the jacket may be of any suitable light-weight material of high strength properties, such as glass fibers, certain mineral fibers or certain linear polymer fibers, for instance.

Further objects and advantages will appear to those skilled in the art from the following, considered in conjunction with the accompanying drawings.

In the accompanying drawings certain modes of carrying out the present invention are shown for illustrative purposes:

Fig. 13 is an enlarged, longitudinal section of a portion of a barrel showing a plug or button being drawn through the barrel to expand the liner; and Fig. 14 is a longitudinal, sectional view of a shot gun barrel of the present invention.

Figure 1:
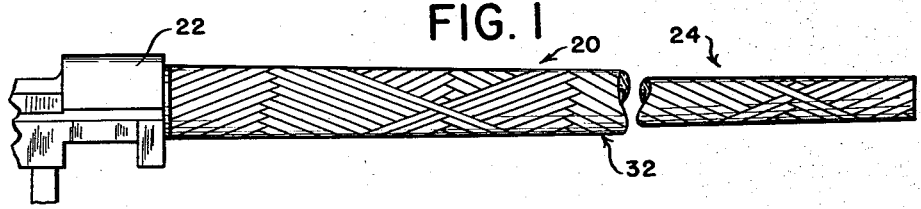
Fig. 1 is a side view of a mounted composite firearm barrel embodying the present invention.
Figure 2:
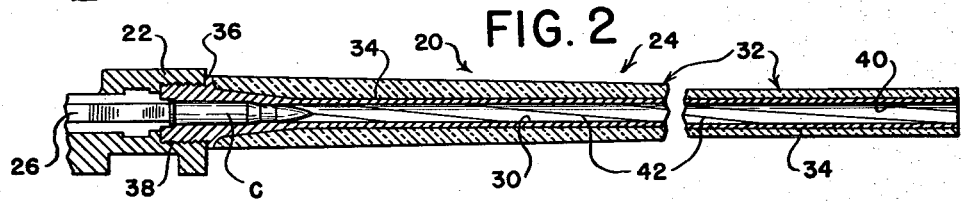
Fig. 2 is a longitudinal section through a mounted composite rifle barrel embodying the present invention.

Referring to the drawings, and more particularly to Figs. 1 and 2 thereof, the reference numeral 20 designates a center-fire firearm, for example, as shown and described in U. S. Patents 2,099,035 and 2,155,512, having a receiver 22 on the forward end of which is mounted a barrel 24. A conventional breech bolt 26 is movable in the receiver 22 into and from its closed position (Fig. 2) in which to lock a cartridge C to be fired in the breech end of the barrel. The breech bolt 26 carries a conventional firing pin and associated mechanism for discharging the cartridge.

The barrel 24 comprises an inner liner 30 and an outer jacket 32. The liner 30 is over the greatest part of its length diametrically reduced externally to leave a cylindrical wall 34 of relatively small thickness, a non-reduced end of the liner forming the breech end 36 of the barrel which may conveniently be threaded at 38 for its reception in the receiver 22. As the exemplary barrel 24 is a rifle barrel, the projectile discharge bore 40 of the liner 30 may be rifled as at 42. The liner may be formed of metal, or of other suitable materials, as the jacket is also relied upon to provide the required physical properties to withstand the high intensity, short duration stresses which are encountered when the gun is fired under abnormal conditions, and to prevent fragmentation if the barrel does burst. This not only permits lightening of the barrel by use of lighter-weight metals than have heretofore been used in the manufacture of gun-barrels are employed. With the jacket supplying the aforementioned physical properties, the liner is much thinner than the conventional gun-barrel now in use, which alone would result in a much lighter barrel.

The jacket 32 may be formed by any of a variety of methods, as described hereinafter, but regardless of the particular method of formation, is essentially composed of a multitude of fibers or filaments of relatively high strength properties which are bonded to each other and to the liner in mutual stress-transmitting relation.

In accordance with a preferred method, a strand or strands 44, each composed of a large number of filaments 46 of glass fibers or other high strength filaments, are wound on the reduced liner wall 34 in superposed layers and a suitable resin binder 50 is applied to the strand or strands, preferably before they are wound on the liner, previously provided with a layer of the binder 50.

Figure 3:
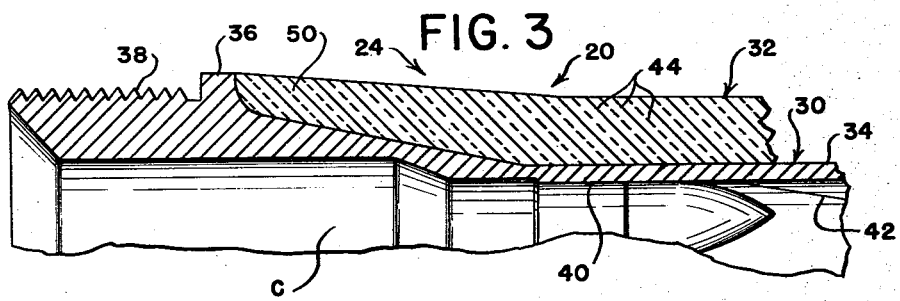
Fig. 3 is an enlarged view of a portion of the rifle barrel shown in Fig. 2.

The initial coating of the liner and winding of the jacket strands may be effected conveniently while the liner 30 is rotated. When the winding has been completed to the desired jacket thickness, resin binder 50 is applied to the external surface. In the diagrammatic representation of the jacket given in Fig. 3, the strands 44 have been wound in superposed layers in the winding process. However, in the completed jacket after the resin binder has been set or cured as by heating, the strands may well be described as losing their individuality, as the resin binder 50 penetrates between the individual filaments of fiber 46. Therefore, the actual jacket structure is more accurately represented by the greatly magnified section shown diagrammatically in Fig. 4. Thus, in the completed jacket, after the resin binder 50 has been set, the filaments or fibers 46 of the wound strands 44 are integrated into a composite unit, all components of which are in mutual stress-transmitting relation, so that they can cooperate in withstanding the stresses which arise when the gun is fired.

The strands 44 may be wound on the liner 30 in several different ways. Thus, a strand or strands 44 may be wound directly on the liner 30 at the slight helix angle indicated in Figure 5. "Helix angle" is defined as the angle between the direction of strand 44 as it is wound and a plane which is perpendicular to the longitudinal axis of the gun liner 30. After the first layer has been completed, a strand 44 may in the next layer be wound on top of the first layer at a similar helix angle in the opposite direction. Next, a strand 44 may in the following layer be wound on top of the second layer at a similar helix angle and in a direction opposite to that in which the strands in the preceding layer are wound. Further successive layers of wound strand 44 may be formed alternately in the manner indicated above. Finally, the top layer of strands may be formed by winding at a similar slight helix angle such as indicated in Fig. 5. The resulting composite barrel 20 thus may have the successive layers of strand turns as shown in cross-section in Figs. 3 and 4.

Figure 6:
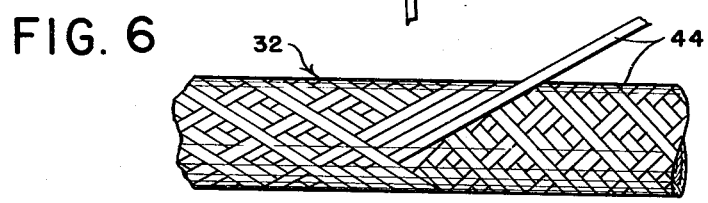
Figure 7:
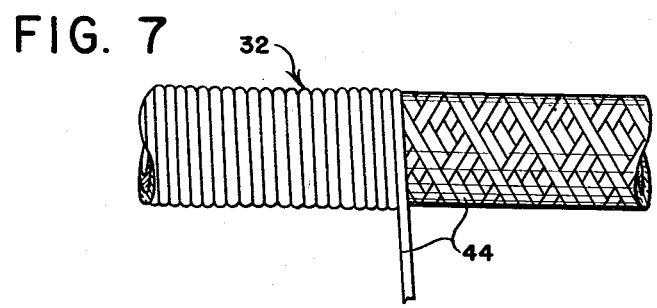

In order to obtain both radial and longitudinal strength the jacket may advantageously be wound at a relatively steeper helix angle as shown in Fig. 6. The strand or strands 44 are started at one end of the liner 30 and wound at a fairly constant angle to the other end and then back to the starting end. This process is continued until the jacket is of the desired thickness, Fig. 6 showing an intermediate stage. The wound jacket has the appearance indicated in Fig. 1.

Figure 8:
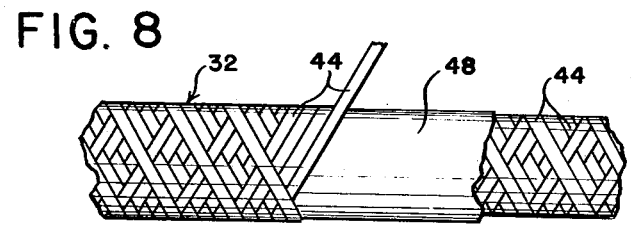

Several of many possible variations are shown in Figs. 7, 8, 9, 10, and 11. In the winding shown in Fig. 7, helical wind in accordance with Fig. 6 has been interrupted for the provision of one or more layers wound radially as shown in Fig. 5. This may be continued until the required jacket thickness has been attained, or the exterior layers may again be more steeply helical, as shown in Fig. 8.

The binder 50 may be applied to the strands 44 in any suitable manner, as by brushing, spraying, immersion, or preimpregnating prior to winding, for instance. Furthermore, the binder is preferably applied to the strands before or while they are being wound on the liner. The strands are preferably dried before the application of the binder. Furthermore, it is advantageous to coat the fibers with a coupling agent, which promotes wetting by and adhesion of the binder. Also, while the binder 50 has been described as being of a resin type, it is to be understood that a binder of any other type may be used as long as it is suitable for the intended purpose of securing the layers of wound fiber strands to each other and to the liner in mutual stress-transmitting relation. Among the many binders suitable for the purpose are polyesters, polyamides, silicones and phenolics, for example. Excellent results have been achieved with a binder known to the trade as "Epoxy," which are condensation products of epichlorohydrin and a polyhydric phenol, such as diphenylol propane. Metallic materials may also be used as binders, for example by winding metal-coated fibers which are subsequently bonded by heat and/or pressure.

Among various fibers which we have tested, glass fibers have produced the best results. Good results are also obtained with other mineral fibers, also with nylon, Dacron, Teflon, Orlon and other linear polymer fibers, for instance. In general we believe any fiber of high strength properties will serve the purpose of lending sufficient strength to a composite barrel to render it substantially burstproof under obstructed firing conditions.

In winding the strands 44 in one or more layers on the liner 30 at a slight helix angle, such as shown in Fig. 5, maximum radial strength is imparted to the composite barrel. In winding the strands 44 in several layers on the liner at a steeper helix angle or angles and also in opposite directions, such as shown in Fig. 6, strength is imparted to the composite barrel both radially and longitudinally. To add even more longitudinal strength to the composite barrel, a layer or layers 48 of fiber strands 44 may also be arranged longitudinally of the liner between layers of radially or helically wound fiber strands, for example as shown in Fig. 8. The intermediate layer or layers 48 of longitudinal strands may be applied conveniently in the form of prebonded sheets in which the strands are bonded together by means of resin.

Figure 9:
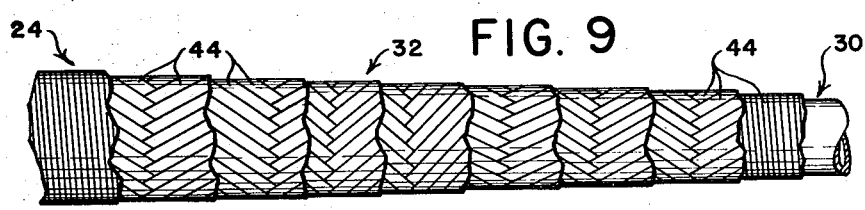

At times, it will be advantageous to apply a plurality of layers of varied orientation to provide the desired combination of radial and longitudinal strength, as indicated in Fig. 9. Following a first layer or layers wherein the strands 44 are substantially radially (slight helix angle) wound, a number of layers are provided wherein the winding is at a steep helix angle. A number of successive layers are then provided which are wound at a small helix angle, followed by an outermost layer or layers wound at a slight helix angle.

Thus, substantially, any desired strength pattern may be imparted to the composite barrel by properly selecting the winding patterns for the strands 44 in the various layers of the jacket 32. Also, the number of successive layers of wound fiber strands on the liner 30 is a matter of choice or convenience, except that at least a number of layers sufficient to lend the composite barrel the requisite strength must be provided.

Figure 10:
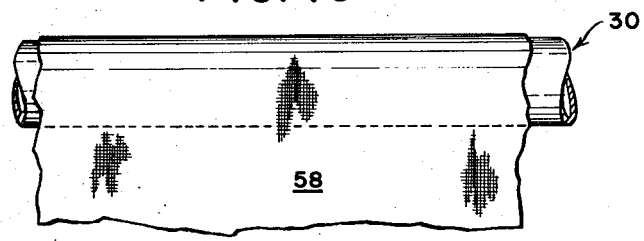
Figs. 10 and 11 are similar views illustrating the formation of a jacket of layers of woven fiber cloth.
Figure 11:
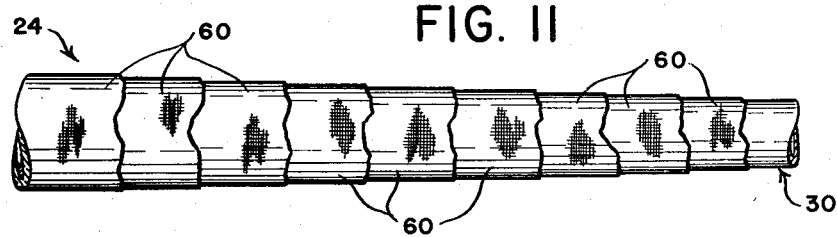

Instead of winding separate fiber strands 44 on the liner 30, woven fiber tape or cloth 58 may be wound thereon (Fig. 10). Thus, several successive layers 60 of woven fiber cloth may be convolutely wound on the liner 30 and secured to each other and to the latter by a suitable binder in mutual stress-transmitting relation (Fig. 11). The resulting composite barrel 24 will have sufficient strength to withstand the exceptional stresses to which it will be subjected under obstructed firing conditions and will be burstproof to all practical intents and purposes, if sufficient layers of cloth made fibers of sufficiently high strength properties are wound on the liner. The cloth may be woven to provide maximum strength longitudinally or laterally of the cloth, and it may be applied to produce its greatest strength in the desired direction.

It is also feasible to use a layer or layers of wound fiber cloth 58 on a liner 30 in conjunction with a layer or layers of wound individual fiber strands thereon. Thus, woven cloth 58 may be substituted for layer or layers of 48 in the structure shown in Fig. 8. Likewise, such layers may be interposed between initial and outer radially wound strand layers (Figs. 5 and 7), all layers being secured to each other and to the liner by a suitable binder.

Woven fiber tape may be utilized in producing composite barrels 24 by helical winding processes, either alone or in combination with convolutely wound layers of woven cloth or substantially radially or helically wound fiber strands. The helical winding of the tape may be effected so that adjacent turns abut each other or overlap somewhat or do not contact each other (open helix, as shown in Fig. 6 for strands). In the latter case, a number of flights back and forth over the liner 30 are required for the provision of a layer completely covering the same.

Figure 12:
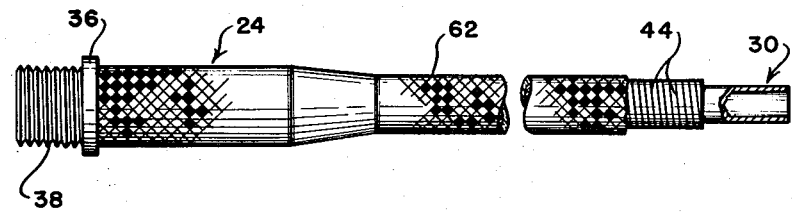
Fig. 12 is a similar view illustrating the use of wound fibers and an outer sleeve of woven cloth.

The wound jackets may advantageously be covered by a cylindrical sleeve of suitable woven pattern, indicated by reference numeral 62 in Fig. 12. The sleeve is slipped over the wound jacket 32 and stretched to cover the same completely. Once in place, the dimensions and weave are such as to resist displacement of the sleeve during subsequent handling of the composite barrel, and it is finally firmly fixed in its proper position after the application and setting of the bonding resin.

The liner 30 (Figs. 2 and 3) may be made of any metal conventionally used for barrels, such as steel, stainless steel, titanium, molybdenum, and alloys of iron, nickel, chromium, cobalt, tungsten and tantalum and any two or more of these metals, etc. The liner may be in normal heat-treated or autofretted condition and have the greater part of its length of reduced wall thickness. In fact, the wall thickness of the liner may be reduced to such an extent as to have substantially the minimum rigidity required for handling. The jacket 32, which is formed of the aforementioned light-weight fibers and a light-weight binder, does not add much weight to that of the liner 30. Hence, the composite barrel is not only burstproof under ordinary obstructed firing conditions, but is also considerably lighter than a conventional metallic barrel of comparable dimensions.

The instant composite firearm barrel of comparable configuration to conventional barrels by reason of its unique construction and properties produces the following important advantages:

It permits the construction of much safer firearms by reason of its ability to resist bursting and fragmentation. By reason of its lighter weight it provides greater facility of handling and pointing and in larger weapons requires less power for traversing and elevation. By reason of its lighter weight it provides tremendous logistic advantages, particularly with regard to airborne transportation and armament. By reason of its unique properties, it permits the use of higher energy or faster burning propellants, thus producing higher projectile velocity, more favorably, projectile energy characteristics and flatter trajectories.

It permits easier carrying and quicker on-the-target shift of personal firearms, machine guns, artillery pieces, mortars, etc., than heretofore. Construction of a gun whose trunnion mounting position can be at the center of gravity (without added breech weights) and closer to the center of percussion nearer the breech thus simplifying the problem of gun stabilization.

The instant composite firearm barrel, by virtue of the different vibrational response of its liner and jacket components to firing stresses and the ensuing vibration-damping interaction between them, has also less disturbing vibration characteristics than present-day metal barrels. These characteristics may be varied and the most favorable vibrations-damping be achieved by appropriate proportions of fibers and binder in the jacket, as well as by incorporation of suitable filler materials therein.

We have found that the composite firearm barrels of this invention have satisfactory heat-dissipation properties. Actual tests have shown that a conventional steel shotgun barrel becomes considerably hotter than the barrel of the present invention when the same number of rounds are fired from each at substantially the same rate. Also the composite barrel was safe for further firing while the steel barrel was not. In handling a composite barrel of the instant kind, the probability of receiving heat burns after firing or frost burns after exposure to low temperatures, is much reduced.

Any suitable filler or fillers may also be added to the binder in order to lend desired characteristics to the barrel. Thus fillers may be used affecting the barrel's characteristics with respect to vibration-damping, rigidity or stiffness, corrosion-resistance, surface friction or wear resistance, heat dissipation or resistance, coloring, etc.

While the liner 30 has heretofore been described as being of any metal from which conventional barrels are made, it may, in view of the strength-lending property of the jacket 32, be also made of suitable non-metallic material. It is desirable but not essential that the coefficient of thermal expansion of the liner be close to that of the surrounding jacket.

Figure 4:
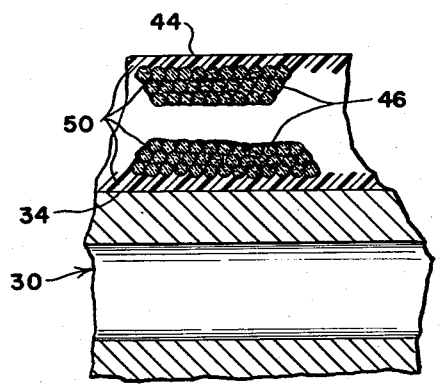
Fig. 4 is a detailed section of a part of the barrel of Fig. 2 on a more enlarged scale.
Figure 5:
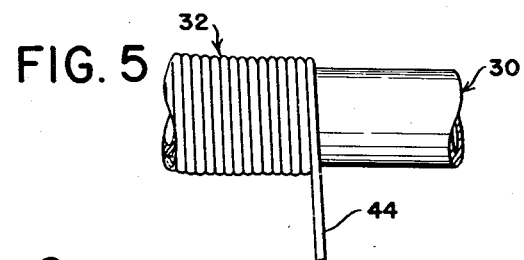
Figs. 5 to 9 are detailed views of portions of gun barrels showing variations in the winding of the strands of the jacket.

While some of the advantages of this invention are available in jacket constructions wherein resin binder is not provided throughout the jacket, particularly insofar as the takeup of the radial load of the liner by the jacket is concerned, a bond between the several fiber layers and between the latter and the liner, such as illustrated in Fig. 4, for instance, is preferred. Thus, the binder 50 between the fibers 46 and between the latter and the liner 30 acts to transmit radial as well as longitudinal stresses from the barrel most directly to the fibers in the jacket, thereby achieving optimum strength of the composite barrel. Also, the binder prevents the creation of capillary passages between the fibers and between the latter and the liner, thereby keeping from these fibers appreciable moisture which may reduce the strength of certain types of fibers used in the formation of the jacket, such as glass fibers.

To obtain optimum strength of the aforementioned composite barrel 24, of which the fibers in the jacket are embedded in the binder 50, the liner 32 may be expanded by forcing or drawing a plug or button 70 therethrough (Fig. 13). A conventional tube expander may also be used for this purpose. In doing so, the fibers in the jacket will be placed under permanent tension and, hence, will be in optimum stress-transmitting relation with each other and with the liner. In the case of a rifle barrel, the plug may be used to produce the rifling in the barrel liner.

Firearm barrels in accordance wtih this invention are likewise well adapted and advantageous for use in rifles for firing rim-fire cartridges, for example, such as are shown and described in U. S. Patent 2,490,474 issued December 6, 1949 to W. C. Roemer; U. S. Patent 2,334,798 issued November 23, 1943 to C. G. Swebilius; and U. S. Patent 2,350,555 issued June 6, 1944 to T. F. Horan.

This invention is also applicable with particular advantage in the provision of outstandingly excellent shotgun barrels, which may be utilized in connection with the various known types of loading and firing mechanisms. As examples, reference may be had to shotguns such as are shown and described in U. S. Patent 961,412 issued June 14, 1910 to T. C. Johnson; U. S. Patent 2,491,218 issued December 13, 1949 to H. H. Sefried; and U. S. 2,592,858 issued April 15, 1952 to R. E. Clarkson. A typical shotgun barrel in accordance with this invention is illustrated in Fig. 14. A thin metal liner 30 has an enlarged portion 80 serving as chamber for shotshell S, and an adjoining forcing cone 82. The muzzle end 84 may be cylindrical or, in the case of a choke gun, provided with a conical taper to decrease the bore diameter for a short distance as the muzzle is approached.

Jacket 32, made of fiber and binder as heretofore described, surrounds the liner 30 and is bonded thereto, being threadedly secured at 38 into receiver 22. In receiver 22, a breech block 26 is movable into and from its closed position in which to lock a shotshell S in chamber 80. The breech block carries a conventional firing pin 86. As the jacket material is readily machinable, the threaded portion 38 consists of machined threads. Prior to curing, the jacket material has excellent molding characteristics and therefore, the threads and contours can be produced by this means.

While the fibers in the various jackets have been described as being wound directly on a liner, whether in the form of strands or woven cloth, it is fully within the purview of the present invention to form each one of these jackets on a mandrel, applying a suitable binder to the fibers and embedding them therein as shown in Fig. 4. A suitable parting agent may be applied to the mandrel in order that the jacket may be stripped off. The jacket thus preformed may then be slipped over a barrel liner and bonded thereto by a suitable binder. It is also within the purview of the present invention to provide on a barrel liner a jacket applied thereon in the form of a mat formed of bonded short fibers in the presence or absence of long fibers, or in the form of a slurry of fibers in a suitable binder, which may be subsequently molded to shape.

An embodiment of a 12 gauge shotgun barrel, which is illustrative of this invention without limitation thereof to specific details, was made as follows. The liner 30 (Fig. 14) was formed of a substantially cylindrical tube of stainless steel, 0.020 inch in wall thickness, provided at the breech end with a chamber position 80 of enlarged diameter as compared with the main tubular portion of the liner and an adjoining forcing cone portion 82. The muzzle end 84 of the liner 30 was cylindrical although other barrels provided with a choking cone to provide the desired distribution of the shot charge have been made.

A jacket was formed of ECG–150–1/0 "Fiberglas," a commercial glass fiber in continuous strand form, manufactured by Owens-Corning Fiberglas Corporation and an "Epoxy" resin such as Shell "Epon 828" sold by Shell Chemical Corporation.

The glass fiber was furnished in continuous lengths of yarn, consisting of eight strands, each strand containing 204 filaments of average diameter of 0.00038 inch, the length to weight ratio per strand corresponding to 15,000 yards per pound. Each filament was provided with a standard coating of a chromium complex for protection against moisture, for lubrication during handling, and for promoting wetting by and adhesion to the resin binder. The fiber was stored at 200° F., followed by thorough dehydration by heating for 2 hours at 400° F. The resin binder was applied to the yarn immediately thereafter during the winding operation. It consisted of "Epon 828" containing several percent by weight of an amino catalyst and about five percent by weight of xylene, as thinner.

The liner 30 was rotated in horizontal position, coated with resin by brushing, and the yarn wound thereon substantially radially (slight helix angle) to a thickness of $\frac{1}{8}$ inch at the breech end and tapering to a thickness of $\frac{1}{32}$ inch at the muzzle. During the winding, the yarn was tensioned by a weight of about one pound, and a copious supply of resin continually furnished over the liner. Then, the winding was changed to a relatively steeper helix angle back and forth over the first layers to completion of the coating, having the appearance indicated in Fig. 1 and thickness of $\frac{3}{16}$ inch.

The resin was cured or set by subjecting the wound liner to 180° F. for two hours, then to 300° F. for one hour, and cooled to room temperature. Finally, the assembly was heated to 400° F. for two hours and air-cooled to room temperature. The jacket made as described above, contained about 80% by weight of glass fiber and the balance of resin binder. The barrel was then machined accurately to the desired dimensions, first by turning on a lathe and then by wet grinding. A top coating of pigmented resin was applied to provide the desired dark color.

In a similar manner, the external layer may consist of a sleeve as shown in Fig. 12. In this case, the wound resin-impregnated liner is inserted into the sleeve. After the sleeve has been extended to cover the liner and resin is applied thereto, and suitably cured, for example in a heated mold.

The above-described shotgun barrel of this invention was subjected to graded obstruction firing tests, as follows:

(1) A light obstruction consisting of a cup wad (flanged disc of paraffined cardboard) placed with the flange disc extended in the direction of the gun breech and two superposed cylindrical wads of fiber was inserted so that the outer face of the upper cylindrical wad was a half inch from the muzzle. The light obstruction consists of the gun wad used in shotshells, as shown in the embodiment of Fig. 2 of U. S. Patent 2,582,124 issued January 8, 1952 to R. S. Holmes. A standard 12 gauge shotshell is fired with the above light obstruction in place, and the firing is repeated with a similar obstruction placed six, twelve and eighteen inches from the muzzle. Under this test, conventional shotguns with steel barrels usually bulge at the obstruction, aluminum barrels crack open, while barrels of this invention show no effect whatever other than an occasional scorch mark.

(2) A more severe series of tests was conducted by insertion of the above obstruction plus half the powder charge of a standard shotshell beneath the cup wad, with each obstructing column being inserted a half inch closer to the breech than in the first series. Conventional steel barrels usually bulge more than in the first series and at times, the barrel cracks. Aluminum barrels open up and sometimes fragment. The barrels of this invention showed no ill effects, other than occasional scorch marks.

(3) The obstruction was increased by providing a full powder charge of a standard shotshell under the cup wad. The steel barrels bulged and burst (longitudinal tearing of the bulged portion), the aluminum barrels shattered into fragments, while the effects in the barrel of this invention were as above described under series 1 and 2.

(4) In this series, the front end of a standard shotshell containing the shot charge was added to the breech end of the obstruction column used in series 3. When fired with this considerable obstruction, steel barrels bulged and burst more extensively than in series 3, and aluminum barrels were shattered into fragments. Barrels of this invention in some instances showed no effect other than scorch marks and where failure occurred, it was a clean transverse break without fragmentation.

A further obstruction test consisted in inserting a loaded 20 gauge standard shotshell, primer end toward the breech, into the breech end of a 12 gauge barrel as far as it will go and then firing a standard 12 gauge shotshell. In this test, conventional steel barrels bulge considerably and usually split open at the obstruction, aluminum barrels shatter into fragments, while barrels of this invention generally show no ill effects.

Composite jackets for .22 caliber and .30 caliber rifles may be made by a procedure similar to that described above. In a typical .30 caliber rifle barrel in accordance with Figs. 1 and 2, the liner has a wall thickness at portion 34 of about 0.030 inch and the completed jacket tapers from a thickness of 3/16 inch at the chamber portion of the bore to 1/8 inch at the muzzle.

While the invention has been described herein in connection with firearms barrels, it is useful in many other fields and particularly in fields requiring materials capable of withstanding very high stresses of very short duration and where a high ratio of strength to weight is desirable. By "very high stresses" we mean pressures greater than 3,500 p. s. i. and by "very short duration," we mean periods of the order of 15 milliseconds or less. Also, in using the term "firearms barrel" or "gun-barrel" we do not intend to limit it to shotguns and small arms rifles, but include all type of apparatus from which a charge or projectile is discharged from a tubular section.

In gun-barrels of present day construction formed of metal or metal alloy, the metal supplies the strength of the barrel as well as other characteristics. Its thickness, and therefore weight, are dictated by certain standards which are considered safe procedures in gun manufacture. In the barrel of our invention the strength is furnished principally by the jacket, and the metallic liner is employed as a supporting medium for this jacket to furnish resistance to wear from projectiles and resistance to the effect of hot burning gases. It also contributes to the rigidity of the barrel and supplies a proper medium for rifling. But, as it is not relied on primarily for strength, it is made much thinner than a conventional gun barrel of metal.

The jacket may be formed of sheets or tape comprising glass fibers, other mineral fibers, or linear polymer fibers and a pressure sensitive adhesive. The use of this type of material eliminates the need of any other binder and the curing of such binders. By applying such sheet or tape under appropriate pressure, the bonding of the layers of the jacket to each other and to the liner is obtained. The binder may be rendered less sensitive to heat by irradiation, as by treatment with gamma rays, after the tape or sheet has been applied to the liner.

We claim:

1. A composite firearm barrel, comprising a liner provided with a projectile discharge bore and having inadequate strength to withstand ordinary internal firing pressures, and an outer jacket thereon formed of a multitude of glass fibers bonded to each other and to said liner in mutual stress-transmitting relation, the glass fibers constituting about 80 percent by weight of the jacket.

2. A firearm barrel comprising a composite structure consisting of a metallic liner, an outer jacket thereon formed of a plurality of fibers bonded to each other and to said liner in mutual stress-transmitting relation, said fibers adding sufficient strength to said liner that said composite structure is capable of withstanding pressures greater than 3500 p. s. i. for periods of 15 milliseconds or less, said fibers constituting about 80 percent by weight of the jacket, and closure means independent of said composite structure for closing, at least, one end of said barrel.

3. A firearm barrel comprising a composite structure consisting of a metallic liner and an outer jacket thereon formed of a plurality of glass fibers bonded to each other and to said liner in mutual stress-transmitting relation, said fibers adding sufficient strength to said liner that said composite structure is capable of withstanding pressures greater than 3500 p. s. i. for periods of 15 milliseconds or less, said glass fibers constituting about 80 percent by weight of the jacket, and closure means independent of said composite structure for closing, at least, one end of said barrel.

References Cited in the file of this patent

UNITED STATES PATENTS

| | | |
|---|---|---|
| 521,911 | Latulip | June 26, 1894 |
| 727,766 | Emery | May 12, 1903 |
| 749,402 | Rost | Jan. 12, 1904 |
| 1,181,704 | Warner | May 2, 1916 |
| 2,467,999 | Stephens | Apr. 19, 1949 |
| 2,572,215 | Swart | Oct. 23, 1951 |
| 2,614,058 | Francis | Oct. 14, 1952 |
| 2,706,356 | Vita | Apr. 19, 1955 |
| 2,736,117 | Clarkson et al. | Feb. 28, 1956 |
| 2,744,043 | Ramberg | May 1, 1956 |
| 2,809,762 | Cardona | Oct. 15, 1957 |